C. W. FISHER.
CARBURETER.
APPLICATION FILED FEB. 7, 1916.
1,317,011.
Patented Sept. 23, 1919.
2 SHEETS—SHEET 2.
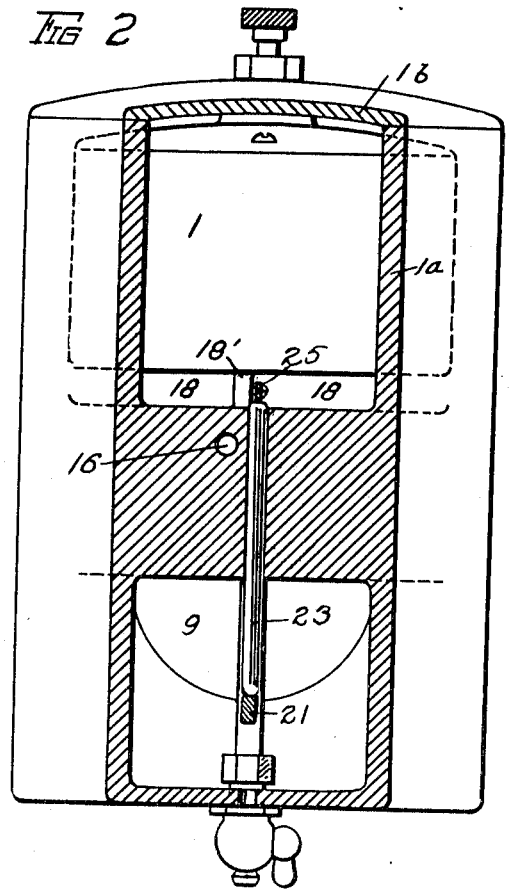
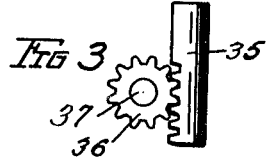
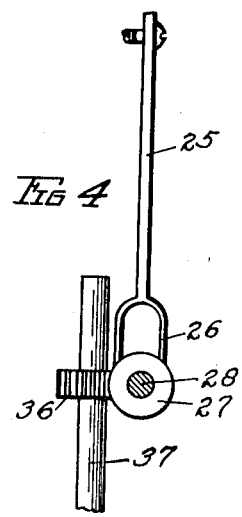
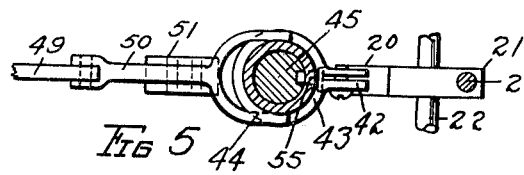
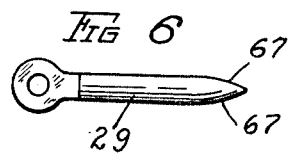
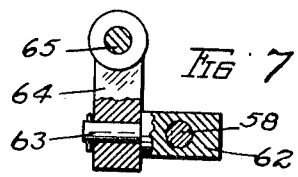
Witnesses
Inventor
Charles W. Fisher
By
Attorneys

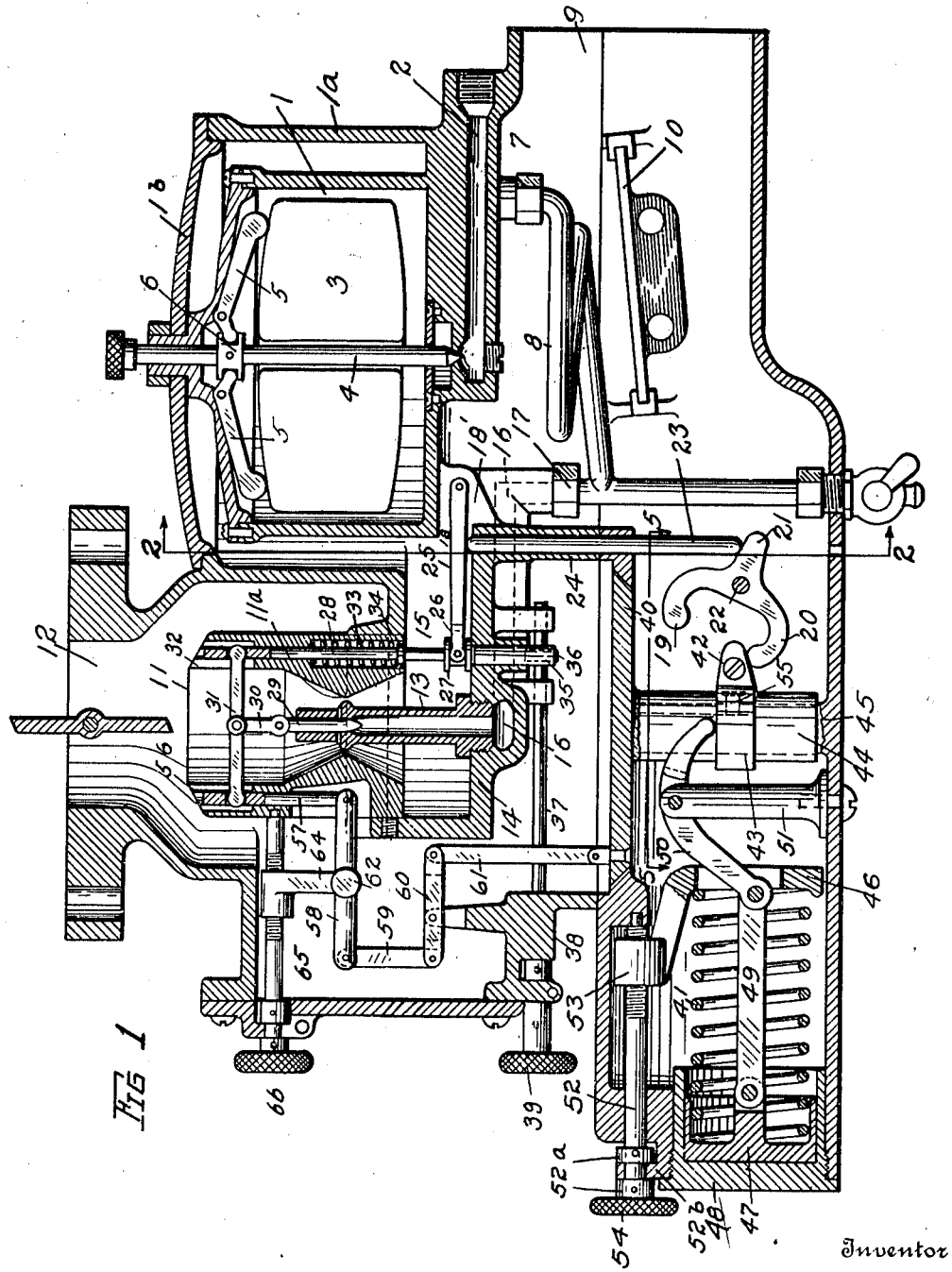

UNITED STATES PATENT OFFICE.

CHARLES W. FISHER, OF SPRINGFIELD, OHIO.

CARBURETER.

1,317,011.                Specification of Letters Patent.    Patented Sept. 23, 1919.

Application filed February 7, 1916. Serial No. 76,630.

*To all whom it may concern:*

Be it known that I, CHARLES W. FISHER, a citizen of the United States, residing at Springfield, in the county of Clark and State of Ohio, have invented certain new and useful Improvements in Carbureters, of which the following is a specification.

This invention relates to improvements in carbureters for internal combustion engines.

An object of the invention is to provide a carbureter which will be efficient in operation, simple and economical in construction and capable of being easily adjusted.

A further object of the invention is to provide means located in the casing of the carbureter for heating the air and fuel upon the initial starting of the engine.

A further object of the invention is to provide efficient means for readily and accurately regulating the proportions of air and fuel both upon the initial starting and subsequent running of the engine so as to furnish a mixture of proper proportions.

A further object of the invention is to provide an arrangement whereby the entire supply of air, both for the initial starting and for the subsequent running of the engine is received from a common source, that is, through a single inlet opening, so that when desired all of the air may be heated to a uniform degree.

A further object of the invention is to so dispose and arrange the various parts as to provide for a more efficient mixing of the air and fuel.

In the accompanying drawings:—

Figure 1 is a longitudinal section of a carbureter embodying my improvements.

Fig. 2 is a section on the line 2—2 of Fig. 1.

Fig. 3 is a detail of a portion of the permanent low speed regulating devices for the fuel.

Fig. 4 is a plan view of some of the fuel regulating devices for the initial starting and also showing some of the permanent low speed adjusting devices.

Fig. 5 is a section on the line 5—5 of Fig. 1.

Fig. 6 is an enlarged detail of the needle valve for the fuel sprayer nozzle.

Fig. 7 is a detail, partly in section, of a portion of the high speed regulating devices.

Referring to the drawings, the supply of gasolene or other fuel is conducted to the float chamber 1 through the inlet passage 2, which is controlled in the usual way by a float 3 which operates the needle valve 4 through the medium of the pivoted levers 5, one end of which rests upon the float and the other end of which operates in the grooved collar 6 connected with the valve 4. The fuel is conducted from the float chamber through the port 7 with which communicates one end of a coil pipe 8, located in a chamber 9. The float chamber is surrounded by an air jacket 1$^a$ and is closed at its upper end by a lid 1$^b$ clamped to the air jacket. The supply of air enters the chamber 9, this supply of air being preferably furnished from a heater (not shown) located in the exhaust. In order, however, to heat the supply of air and also the fuel for the initial starting of the engine, I have provided an electric heater 10 located in the chamber 9 just beneath the coil pipe 8 and in the path of incoming air; the terminals of this heater being connected with any suitable electric source, such as the storage battery of a motor car.

The Venturi tube 11 is located in the chamber 12 and has its inner wall tapered inwardly and thence outwardly as shown so that a restricted passage-way 11$^a$ is formed closely adjacent the outlet openings at the fuel spray nozzle 13, which is screwed into the floor 14 of an air chamber 15 which communicates with the lower end of the Venturi tube; the spraying nozzle projecting up into the tube in the usual way. The interior of the spraying nozzle is in communication with the coil tube 8 through the passage 16 in the floor of the chamber 15, a suitable coupling 17 connecting the passage 16 and tube 8. The supply of air which enters the tube 11 is received from the chamber 9 through passageways 18 located on either side of the web 18' which connects the floor 14 with the bottom of the float chamber, as shown best in Fig. 2. It is the purpose to admit only enough air through the tube 11 to provide a rich mixture for starting purposes, but at the same time the suction of the air must be such as to properly draw fuel from the spraying nozzle. This is accomplished by the restricted passageway before described as a result of which but a comparatively small quantity of air is admitted to the tube but that air will enter the tube with great force, the air rushing rapidly past the small outlet openings in the spraying nozzle so as to exert a greater suction upon the fuel.

In starting, as before stated, all the air is taken through the ports 18 and the restricted passageway in the tube 11. Also, means are provided for operating the needle valve of the spraying nozzle so as to furnish a greater supply of fuel. Located in the lower part of the carbureter casing is a lever provided with three arms 19, 20 and 21. This lever is connected to a shaft 22 which projects through the walls of the casing and has connected therewith suitable devices (not shown) extending within convenient reach of the driver for operating the lever. The arm 21 lies beneath a rod 23 which extends up through a division wall 24 and also through the floor 14 to a point in proximity to the underside of a pivoted lever 25, the outer free end of which is formed with a yoke 26 which lies in the grooved collar 27 secured to the lower end of a rod 28 which projects up through the wall of the tube 11.

Pivotally connected to the needle valve 29 of the spraying nozzle by a link 30 is a cross-bar 31, one end of which has a rounded head which fits in an opening in the upper end of the rod 28, the upper end of the tube being recessed as indicated at 32 to permit of vertical movement of the bar. As a result of this construction, when the arm 21 of the operating lever is raised, the needle valve 29 will be raised and admit a greater supply of fuel so as to supply a rich mixture for starting, the needle valve being held raised by the devices which operate the arm 21 until released by the driver, whereupon the parts will be restored to normal position by the spring 33 which is placed in a recess formed in the walls of the tube 11 and bears upon a collar 34 fixed to the rod 28. The normal position of these valve operating devices, which is the low speed position, is determined by a stop which is in the nature of a rack 35 which projects up through the floor 14 and is operated to different positions by a pinion 36 on a shaft 37 which projects out through the side wall 38 and has a knurled finger piece 39 with which the parts may be adjusted so as to accurately determine the low speed position of the needle valve.

The secondary air supply is furnished through an opening controlled by a valve 40, this opening being located directly beneath the air chamber 15 so that the supply of air admitted therethrough will circulate freely about the chamber and tube 11 and commingle with the mixture from the tube in a thorough manner; the tube and air chamber 15 being separated from the outside walls of the carbureter casing by a space sufficient to admit the necessary amount of air.

The location of the air valve directly beneath the tube 11 so that the air will circulate about the tube and in same direction as the mixture leaving the upper end of the tube, insures the thorough mixing of the air and mixture from the tube and this arrangement is one of the important features of my invention.

In starting, when the arm 21 is raised to admit an increased amount of fuel, the arm 19 will contact a projection 42 on a collar 43 secured to a sleeve 44 which is connected with the valve 40, so as to lock the valve 40 to its seat during the starting operation; the sleeve 44 being slidably mounted on a stud 45 which projects upwardly from the bottom of the outer casing. When the operating devices have been released so as to permit the return of the needle valve 29 to its normal low speed position, the arm 20 will contact the underside of the projection 42 and slightly raise the valve 40 from its seat so as to admit a supply of air therethrough sufficient for low speed running. As the engine increases in speed, the valve 40 will be further opened to admit an increased supply of air by the suction of the engine and at the same time the needle valve 29 will be proportionately opened to admit a proportionate increased amount of fuel.

In order that the valve 40 will open by the suction of the engine to the proper extent proportionate to the speed of the engine, I have provided a spring 41, one end of the spring bearing against an adjustable abutment 46 and the other being located in a hollow piston 47 which is fitted in a cylindrical plug 48 screwed into the walls of the casing. The piston 47 is pivotally connected by a link 49 to a yoke 50, pivoted to the upper end of the standard 51 and having its forked end bearing upon the upper edge of the collar 43. As the valve 40 raises it moves the piston 47 in the cylindrical plug 48 and places the spring under increased tension. This piston 47 is more or less loosely placed in the cylindrical plug so that air may find itself to the rear thereof and cause it to act in the nature of an air cushion or dash pot to prevent the too sudden closing or fluttering of the valve 40 when the fuel supply is shut off. A stem 52, one end of which is threaded into a boss 53 on the abutment 46 and the other end of which extends to the outside of the carbureter casing and has a knurled finger piece 54 furnishes the means for adjusting the tension of the spring; the stem being held against endwise movement by collars 52$^a$ located on opposite sides of a flange 52$^b$.

The valve 40 is kept from turning in its seat by a pin 55 (shown in dotted lines in Fig. 1 and also in Fig. 5) which projects loosely through an opening in the sleeve 44 into a vertically extending groove in the stud 45, and held in place by the collar 43.

As before stated, as the valve 40 opens by the suction of the engine, the needle valve 29 is proportionately opened, this being accomplished in the following manner: The bar 31, previously described as being pivotally connected with the needle valve 29, has one end thereof projecting into a recess 56 in the tube 11 and provided with a rounded head which extends into an opening in the upper portion of a rod 57 slidably mounted in the walls of the tube 11. The lower end of this rod 57 is pivotally connected to one end of a pivoted lever 58, the opposite end of said lever being connected by a link 59 with one end of a pivoted lever 60, the opposite end of which is pivotally connected by a link 61 to the valve 40, as a consequence of which as the valve 40 raises the needle valve 29 will also be proportionately raised.

In order to adjust the rate of high speed opening movement of the needle valve 29, I have provided an adjustment in the nature of a movable fulcrum for the lever 58. The lever 58, which is round, projects through a block 62 which has a trunnion 63 rotatably mounted in the lower end of an arm 64, the upper end of which has a boss threaded on a stem 65, one end of which is supported by the tube 11, and the other end of which projects out through the casing and is provided with a knurled finger-piece 66. By turning the rod 65 the arm 64 can be moved so as to slide the fulcrum block 62 to any point upon the lever 58.

It has been usual heretofore to form the needle valve which controls the gasolene supply with a point having straight sides. In my experiments I have discovered that such form of valve admits too much fuel at the initial opening of the valve, much better results being secured if the initial opening of the valve admits but a small increased supply of fuel and the fuel supply then rapidly increased as the valve continues its opening movement and the engine goes to high speed. In order to accomplish this I have provided a needle valve having a point formed with outwardly rounded or convex faces as indicated at 67 which will admit but a minimum increase of fuel upon the initial movement of the needle, but allow the supply of fuel to rapidly increase.

Having thus described my invention, I claim:

1. In a carbureter, a tube, a fuel sprayer nozzle located in said tube, an air supply chamber located beneath said tube and communicating therewith, an air valve located beneath said chamber controlling an opening to an air space arranged about said chamber and tube, and devices for controlling the supply of fuel from said nozzle to admit a greater supply of fuel and also for locking said air valve against opening.

2. In a carbureter, a vertically arranged tube, a vertically arranged sprayer nozzle located in said tube, an air supply chamber beneath said tube and communicating therewith, an air valve located beneath said chamber controlling an opening to an air passageway arranged about said chamber and tube, and a main air inlet having a communication with said chamber and with the opening controlled by said valve, and devices for controlling said nozzle to permit a greater supply of fuel therefrom and also at the same time for locking said air valve to its seat.

3. In a carbureter, a vertically arranged tube having a restricted passageway, a sprayer nozzle in said tube having its outlet arranged in proximity to the point of greatest restriction in said passageway, an air supply chamber communicating with the lower end of said tube, an air valve located beneath said chamber controlling an opening to an air space about said chamber and tube, and devices for controlling the outlet of said nozzle to permit a greater supply of fuel therefrom and at the same time locking said air valve to its seat.

4. In a carbureter, a tube, a fuel sprayer nozzle located in said tube, an air supply chamber located beneath said tube and communicating therewith, an air valve located beneath said chamber controlling an opening to an air space arranged about said chamber and tube, devices for controlling the supply of fuel from said nozzle arranged to permit a greater supply of fuel therefrom and at the same time lock said air valve, means for returning said devices to normal position, and an adjustable stop for the normal position of said devices.

5. In a carbureter, a tube, a fuel sprayer nozzle located in said tube, a needle valve for said nozzle, a rocking bar pivotally connected with said needle valve, a slidable rod located in the walls of said tube and having an operative connection with said bar, an adjustable stop for the normal position of said rod, an air chamber communicating with the lower end of said tube, an air valve located beneath said chamber controlling an opening to an air space about said chamber and tube, devices for raising said rod to operate said needle valve to permit a greater supply of fuel from said nozzle, and means whereby said devices also at the same time lock said air valve to its seat.

6. In a carbureter, a tube, a fuel sprayer nozzle located in said tube, a needle valve for said nozzle, a rocking bar pivotally connected with said needle valve, a slidable rod located in the walls of said tube and having an operative connection with said bar, an adjustable stop for the normal position of said rod, an air chamber communicating with the lower end of said tube, an air valve located beneath said chamber controlling an opening to an air space about said chamber and tube, devices for raising said rod to operate said needle valve to permit a greater supply of fuel from said nozzle, and means whereby said devices also at the same time lock said air valve to its seat, a spring for returning said rod to normal position against said stop when said devices are restored to normal position.

7. In a carbureter, a tube, a spraying nozzle therein, a needle valve for said nozzle, a rod arranged in the walls of said tube having an operative connection with said needle valve, means for operating said rod, a rack bar located in line with said rod, a pinion in mesh with said rack bar, and a shaft to which said pinion is secured extending to a point on the outside of the carbureter casing.

8. In a carbureter, a tube, a fuel sprayer nozzle located in said tube, an air supply chamber located beneath said tube and communicating therewith, an air valve located beneath said chamber controlling an opening to an air space arranged about said chamber and tube, devices for controlling the supply of fuel from said nozzle, said devices when operated being arranged to permit a greater supply of fuel from said nozzle and to lock said air valve to its seat and when restored to normal position to permit a normal supply of fuel and to slightly raise said air valve from its seat.

9. In a carbureter, a tube, a fuel sprayer nozzle in said tube, said tube having a communication with a fixed supply of air, an air valve located beneath said tube controlling an opening to an air space about said tube, said air valve being controlled by the suction of the engine, a needle valve for controlling said nozzle, and a connection between said air valve and said needle valve comprising a lever having an adjustable fulcrum.

10. In a carbureter, the combination of a mixing chamber having openings for the admission of primary and secondary air, a fuel nozzle for supplying fuel to the primary air admitted to the mixture chamber before such primary air encounters the secondary air, a needle valve controlling the outlet from said fuel nozzle, a spring pressed automatic air valve controlling the admission of secondary air to said mixture chamber, means independent of the spring of said automatic secondary air valve for preventing it from opening, and means operated by the operation of said opening-preventing means for producing an opening of said needle valve.

11. In a carbureter, a tube, a spraying nozzle therein, a needle valve for said nozzle, a cross-bar pivotally connected with the upper end of said valve, a rod at each end of said cross-bar having a loose connection therewith, an auxiliary air valve connected with one of said rods, and manually controlled means connected with the other of said rods for raising said needle valve.

12. In a carbureter, a tube, a spraying nozzle therein, a needle valve for said nozzle, a cross-bar pivotally connected with the upper end of said valve, slidable rods arranged in the walls of said tube, an auxiliary air valve, a loose connection from one end of said cross-bar to one of said rods, a connection from the other end of said rods to said auxiliary air valve, and a loose connection between said cross-bar and the other of said rods, together with means for raising said latter rod.

13. In a carbureter, a tube, a spraying nozzle therein, a needle valve for said nozzle, a cross-bar pivotally connected with the upper end of said valve, slidable rods arranged in the walls of said tube, an auxiliary air valve, a loose connection from one end of said cross-bar to one of said rods, a connection from the other end of said rod to said auxiliary air valve, a loose connection between said cross-bar and the other of said rods, together with means for raising said latter rod, and a spring for restoring it to normal position.

14. In a carbureter, a tube, a spraying nozzle therein, a needle valve for said nozzle, a cross-bar pivotally connected with the upper end of said valve, slidable rods arranged in the walls of said tube, an auxiliary air valve, a loose connection from one end of said cross-bar to one of said rods, a connection from the other end of said rod to said auxiliary air valve, a loose connection between said cross-bar and the other of said rods, together with means for raising said latter rod, a spring for restoring it to normal position, and an adjustable stop for said latter rod.

15. In a carbureter, a tube, a spraying nozzle, a needle valve for said nozzle, a cross-bar pivotally connected with the upper end of said valve, slidable rods arranged in the walls of said tube, one at each end of said cross-bars, the respective ends of said cross-bar being provided with rounded heads and the respective rods with recesses to receive said heads to provide loose connections, an auxiliary air valve connected to one of said rods, and manually operated means for operating the other of said rods.

In testimony whereof I have hereunto set my hand this 4th day of February, 1916.

CHARLES W. FISHER.

Witness:
CHAS. I. WELCH.